(12) United States Patent
Willett et al.

(10) Patent No.: US 7,689,474 B2
(45) Date of Patent: Mar. 30, 2010

(54) GROUP QUOTING SYSTEM FOR HOUSING COMPONENTS

(75) Inventors: Francis G. Willett, Adrian, MI (US);
Heather S. Price, Morenci, MI (US);
Steven L. Hester, Toledo, OH (US)

(73) Assignee: Masco Builder Cabinet Group, Adrian, MI (US)

( * ) Notice: Subject to any disclaimer, the term of this patent is extended or adjusted under 35 U.S.C. 154(b) by 863 days.

(21) Appl. No.: 11/201,750

(22) Filed: Aug. 11, 2005
(Under 37 CFR 1.47)

(65) Prior Publication Data
US 2007/0038521 A1 Feb. 15, 2007

(51) Int. Cl.
*G06F 17/30* (2006.01)
(52) U.S. Cl. .......................................... 705/27; 705/26
(58) Field of Classification Search .................... 705/27, 705/26
See application file for complete search history.

(56) References Cited

U.S. PATENT DOCUMENTS

| | | | |
|---|---|---|---|
| 6,345,258 B1 * | 2/2002 | Pickens ........................ 705/1 |
| 6,539,401 B1 * | 3/2003 | Fino et al. .................... 707/201 |
| 6,922,701 B1 * | 7/2005 | Ananian et al. ........... 707/104.1 |
| 2002/0099617 A1 * | 7/2002 | Fogelson ..................... 705/26 |
| 2002/0188526 A1 * | 12/2002 | Muneishi et al. .............. 705/26 |

* cited by examiner

*Primary Examiner*—Robert M. Pond
(74) *Attorney, Agent, or Firm*—Carlson, Gaskey & Olds, P.C.

(57) ABSTRACT

A quoting system for housing components, especially cabinets, includes a product database storing a plurality of product identifiers for different cabinet components, each having an associated cabinet style. The system further includes a quote database storing a plurality of quotes, each quote relating each of a plurality of pricing groups with each of a plurality of floorplans. A user interface permits a user to associate each of the plurality of styles with one of the plurality of pricing groups. One style within each pricing group may be selected as the primary, so that pricing of all of the styles in the pricing group will be based upon the pricing of the primary style and the pricing of all of the other styles in that pricing group will be overridden automatically.

13 Claims, 2 Drawing Sheets

| Quote | Plans | Options | Buckets | Room Totals |
|---|---|---|---|---|
| Quote_1 | Plan_A | Option_1 | Base | $x1 |
| Quote_1 | Plan_A | Option_1 | UP1 | $x2 |
| Quote_1 | Plan_A | Option_1 | UP2 | $x3 |
| Quote_1 | Plan_A | Option_2 | Base | $x4 |
| Quote_1 | Plan_A | Option_2 | UP1 | $x5 |
| Quote_1 | Plan_A | Option_2 | UP2 | $x6 |
| | | • | | |
| | | • | | |
| | | • | | |
| | | • | | |
| Quote_1 | Plan_D | Option_2 | UP2 | $xn |

| Quote | Plans | Options | Buckets | Room Totals |
|---|---|---|---|---|
| Quote_1 | Plan_A | Option_1 | Base | $x1 |
| Quote_1 | Plan_A | Option_1 | UP1 | $x2 |
| Quote_1 | Plan_A | Option_1 | UP2 | $x3 |
| Quote_1 | Plan_A | Option_2 | Base | $x4 |
| Quote_1 | Plan_A | Option_2 | UP1 | $x5 |
| Quote_1 | Plan_A | Option_2 | UP2 | $x6 |
| | | • | | |
| | | • | | |
| | | • | | |
| Quote_1 | Plan_D | Option_2 | UP2 | $xn |

Fig-2

| Valid | Brand | Product Line | Series | Prod. Line | Bucket... | Price Point | Type | Edit Flag | Default Pro... | Quote ID | Hardware F. |
|---|---|---|---|---|---|---|---|---|---|---|---|
| Update | WOW | 1109 | 1-STD | 0.3 | Base | PRI | RG | VAL | 133334 | 14156 | N |
| Valid | Mer | VOA-STD | 1-STD | 0.3 | Base | PRI | RG | VAL | 133336 | 14156 | N |
| Valid | Mer | VOS-STD | 1-STD | 0.3 | UP10 | | RG | VAL | 133335 | 14156 | N |
| Valid | Mer | ROA-STD | 1-STD | 0.3 | UP11 | PRI | RG | VAL | 133338 | 14156 | N |
| Valid | Mer | ROS-STD | 1-STD | 0.3 | UP12 | | RG | VAL | 133337 | 14156 | N |
| Valid | Mer | RMA-STD | 1-STD | 0.33 | UP13 | PRI | RG | VAL | 133343 | 14156 | N |
| Valid | Mer | CLA-STD | 1-STD | 0.315 | UP14 | | RG | VAL | 133342 | 14156 | Y |
| Valid | Mer | CLS-STD | 1-STD | 0.31 | UP3 | | RG | VAL | 133341 | 14156 | Y |
| Valid | Mer | RMS-STD | 1-STD | 0.33 | UP3 | | RG | VAL | 133344 | 14156 | N |
| Valid | Mer | WAII | 1-STD | 0.315 | UP3 | | STD | VAL | 133340 | 14156 | Y |
| Valid | Mer | WBII | 1-STD | 0.31 | UP3 | | STD | VAL | 133339 | 14156 | Y |

Default Product Lines For Quote: 120105 001

Update Default Product Lines

To Use
Enter the Product Line, Series and Factor then Press Add Product Line.
After you finish entering your Product Lines, press OK to Save and Exit.

Rapid Product Line Entry
Product Line [ ]  Series [STD]  Factor [0.3]  Add Product Line Quote All Essentials
Quote All Classic
Quote Essential Report Groups
Quote Classic Report Groups OK    Cancel Ready

GROUP QUOTING SYSTEM FOR HOUSING COMPONENTS

BACKGROUND OF THE INVENTION

This invention relates to housing construction and more particularly to a system for generating a quote for housing components, namely cabinets.

Generally, when a housing development is under construction a cabinet supplier for the development provides the builder with a quote for cabinets for the houses in the development. The cabinet supplier has numerous product lines (or styles), each with different prices. The builder selects a subset of the supplier's product lines of cabinets and the supplier provides a quote to the builder for the cabinets in that subset. This subset of cabinets is made available at different prices for selection by purchasers of the houses in the development. However, the subset of cabinets still presents numerous styles at numerous different prices. In order to simplify the selection process for the purchasers, these cabinets are usually sub-grouped into "buckets," so that all cabinets in the same bucket have the same price. Therefore, the decision for the purchaser can be simplified into "standard, upgraded or premium" price levels (for example), with several cabinets available at each price level.

The housing development typically includes several floor plans, each with different requirements for cabinets. Each floor plan may further include optional layouts, such as an expanded kitchen or master bath, which would have different requirements for cabinets.

The cabinet supplier provides a quote to the builder for each optional layout of each floor plan in each style of available cabinet. In that way, the builder could provide the range of options to the purchasers and the prices for each option. When the purchaser selects a floor plan, any optional layouts and cabinet style, the builder would communicate these selections to the cabinet supplier to place the order.

Implementing this has been time consuming and complicated. Since the cabinets in the supplier's database may all have different prices, the prices must be manually overridden in the quote to the builder in order to provide the bucket pricing feature. Generally, this has been implemented by manually forcing the total for each room quote for each cabinet in the price level subgroup to be the same.

SUMMARY OF THE INVENTION

An improved quoting system for housing components, especially cabinets, is provided by the present invention. The quoting system includes a product database storing a plurality of product identifiers for different cabinet components, each having an associated cabinet style. The system further includes a quote database storing a plurality of quotes, each quote relating each of a plurality of pricing groups with each of a plurality of floorplans. A user interface permits a user to associate each of the plurality of styles with one of the plurality of pricing groups.

In the particular implementation described herein, the user associates a subset of the plurality of available styles to each of the plurality of pricing groups. One style within each pricing group is selected as the primary, so that pricing of all of the styles in the pricing group will be based upon the pricing of the primary style and the pricing of all of the other styles in that pricing group will be overridden automatically. By creating and automatically implementing pricing through the pricing groups, the quoting process is greatly simplified.

BRIEF DESCRIPTION OF THE DRAWINGS

Other advantages of the present invention can be understood by reference to the following detailed description when considered in connection with the accompanying drawings wherein:

FIG. 2 illustrates one possible computer screen for associating cabinet styles to pricing buckets in a quote.

DETAILED DESCRIPTION OF THE PREFERRED EMBODIMENTS

Figures 1, 3:
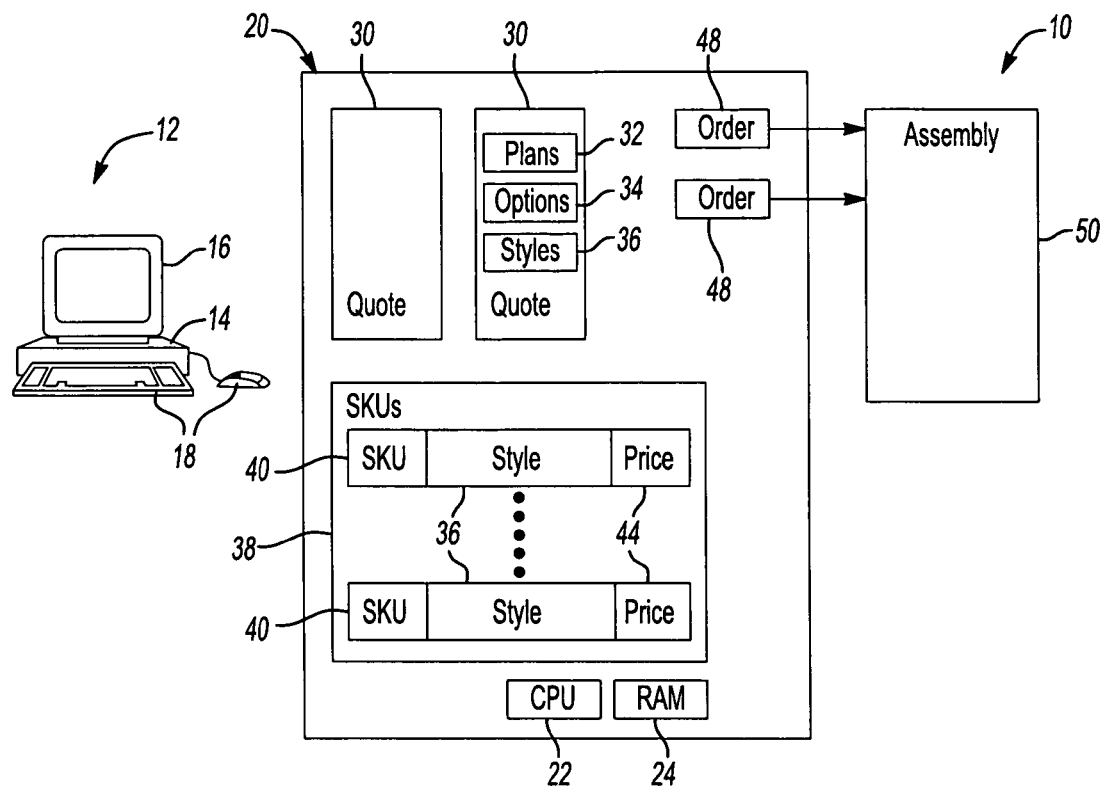
FIG. 1 is a schematic of one possible quoting system according to the present invention.
FIG. 3 illustrates one example report generated based upon the quote of FIG. 2.

A quoting and ordering system 10 according to one embodiment of the present invention is shown schematically in FIG. 1. The system 10 includes one or more user computers 12 (one shown) each having a CPU 14, display 16 and user input devices 18. The user computer 12 is networked to a server 20 having a CPU 22 and storage media 24, such as RAM, hard drives, and any other computer storage storing software for performing the functions described herein.

The storage media 24 further includes a database of a plurality of quotes 30. Each quote 30 (only one is shown in detail) stores information regarding the plans 32, layout options 34 and styles 36 associated with a different housing development. Each quote 30 associates each of the plans 32, options 34 and styles 36 with SKUs in a SKU database 40. The SKU database 38 lists all SKUs 40 (or part numbers or product ids) associated with all cabinet components and associated hardware. The SKUs 40 for cabinet components are each associated with a cabinet style 36 and may have an associated price 44 (or price code or discount information).

Eventually, based upon the software and user inputs via user computer 12, the server 20 converts the quotes 30 to orders 48. The orders 48 contain the specific SKUs 40 needed for a house, the total price, delivery date, delivery location, billing party, etc. The orders 48 are sent to an assembly plant 50 where the cabinets are assembled for each order 48. The user computer 12 may access software running on the server 20 via a web browser, for example.

For generating the quote 30, a bucket pricing screen 60 that would be displayed on the display 16 of FIG. 1, for example, is shown in FIG. 2. In this screen 60, a subset of the cabinet styles 36 in the database (FIG. 1) has been chosen from the database (FIG. 1) for this particular quote 30. Each cabinet style 36 has an associated product id 62 (or product id) and associated price information 64 (in this example, a discount level). Each cabinet style 36 also has an associated hardware flag 66, which indicates whether an additional hardware SKU needs to be added whenever this cabinet style 36 is selected. Each cabinet style 36 further includes a pull-down menu for selecting one of a plurality of pricing groups or levels or "buckets" 68. In the example shown, some of the buckets 68 are named BASE, UP1, UP2, etc. Any number of buckets 68 could be used in one quote 30, although since the purpose of the bucket pricing is simplification of pricing, it is anticipated that three to five buckets 68 would be used.

The bucket pricing is different for each quote 30. The bucket pricing screen 60 in FIG. 2 is only for the selected quote 30 shown, so that each cabinet style 36 can be associated with a different bucket 68 in each quote 30. More than one cabinet style 36 would be associated with each bucket 68. One of the cabinet styles 36 in each bucket 68 would be designated the primary 70, meaning that the pricing of this cabinet style 36 would set the pricing level for this bucket 68 in this quote 30. Changing the pricing of the primary cabinet style 36 in the quote 30 will change the pricing of the bucket 68, and all the cabinet styles 36 in the bucket 68.

After the pricing and buckets 68 have been assigned to all of the styles 36, a report 80 can be generated from the quote 30 such as is shown in FIG. 3. The report 80 generates room totals 82 for each of the plurality of plans 32 with each of the plurality of layout options 34 with each of the plurality of buckets 68. The example report 80 shown illustrates Plans A-D, with Options 1 and 2, and Buckets BASE, UP1 and UP2, but any number of plans, options and buckets can be used.

The plans 32 and layout options 34 dictate which cabinet components will be required, while the buckets 68 determine a pricing level for the cabinet components. Therefore, each of the room totals 82 varies among the buckets 68, but is consistent among cabinet styles 36 (FIG. 2) within a bucket 68. This provides a simplified quote report 80 to the builder, so that the home purchasers can choose any of a plurality of cabinet styles 36 within a pricing level (bucket 68) at the same cost, or choose one of several upgraded levels, in each of which several styles would be available.

The system 10 and method of the present invention streamlines the quoting process. Then, referring to FIG. 1, when an order 48 is placed, an order 48 is generated based upon the buckets 68 and associated pricing in the quote 30. The orders 48 contain the specific SKUs 40 needed for a house, the total price, delivery date, delivery location, billing party, etc. The orders 48 are sent to an assembly plant 50 where the cabinets are assembled for each order 48.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A cabinet quoting system comprising:
    a product database storing a plurality of product identifiers, each having an associated style;
    a quote database storing a plurality of quotes, each quote relating each of a plurality of pricing groups with each of a plurality of floorplans; and
    a user interface programmed to permit a user to associate each of the plurality of styles with one of the plurality of pricing groups.

2. The system of claim 1 wherein the quote database associates a group price with each of the plurality of floorplans for each of the plurality of pricing groups.

3. The system of claim 2 wherein the quote database associates each of the product identifiers with a product price and wherein the quote database overrides the product price of a selected product identifier of the plurality of product identifiers to implement the group price associated with the associated pricing group of the selected product identifier.

4. The system of claim 3 wherein the user interface displays a list of the plurality of styles so that the user can associate each of the plurality of styles with one of the plurality of pricing groups.

5. The system of claim 1 wherein the quote database includes room total prices each associated with one of the plurality of pricing groups for each of the plurality of floorplans.

6. A method for generating quotes for cabinets for a housing development including the steps of:
    associating a quote with a plurality of floorplans in a computer database;
    associating each of the plurality of floorplans with a set of cabinet components in the database;
    associating each of a plurality of cabinet styles to one of a plurality of pricing groups in the database; and
    generating a floorplan price for each of the plurality of floorplans for each of the plurality of pricing groups based upon the associated set of cabinet components in the database.

7. The method of claim 6 wherein each of the plurality of cabinet components is associated with one of the cabinet styles and wherein each of the plurality of cabinet components has an associated component price, the method further including the step of overriding the component price based upon the group price associated with the cabinet style that is associated with the component.

8. A cabinet quoting system comprising:
    a product database storing a plurality of product identifiers for a plurality of cabinet components, each having an associated cabinet style;
    a quote database storing a plurality of quotes, each quote relating each of a plurality of pricing groups with each of a plurality of floorplans; and
    a user interface programmed to permit a user to associate each of the plurality of styles with one of the plurality of pricing groups, the user interface programmed to permit the user to change a group price for each of the plurality of pricing groups.

9. The system of claim 8 wherein the quote database associates a group price with each of the plurality of floorplans for each of the plurality of pricing groups.

10. The system of claim 9 wherein the user interface displays a list of the plurality of styles so that the user can associate each of the plurality of styles with one of the plurality of pricing groups.

11. The system of claim 10 wherein the quote database includes room total prices for each of the plurality of pricing groups for each of the plurality of floorplans.

12. The system of claim 11 wherein the user interface is programmed to change the room total prices based upon the user changing the associated pricing group of one of the plurality of styles.

13. The system of claim 8 wherein more than one of the plurality of styles are associated with each of the plurality of pricing groups.

* * * * *